US012400375B2

(12) United States Patent
Gherman

(10) Patent No.: US 12,400,375 B2
(45) Date of Patent: Aug. 26, 2025

(54) MULTI DEVICE ARTWORK SCALING SYSTEM

(71) Applicant: CUBE MG LLG, New York, NY (US)

(72) Inventor: Samuel Gherman, New York, NY (US)

(73) Assignee: DA VINCI EYE, LLC, New York, NY (US)

( * ) Notice: Subject to any disclaimer, the term of this patent is extended or adjusted under 35 U.S.C. 154(b) by 550 days.

(21) Appl. No.: 17/871,894

(22) Filed: Jul. 22, 2022

(65) Prior Publication Data

US 2022/0358690 A1 Nov. 10, 2022

Related U.S. Application Data

(63) Continuation-in-part of application No. 16/394,943, filed on Apr. 25, 2019, now Pat. No. 11,462,122.

(60) Provisional application No. 63/338,860, filed on May 5, 2022.

(51) Int. Cl.
*G09B 11/04* (2006.01)
*G06F 3/04842* (2022.01)
*G06T 11/00* (2006.01)

(52) U.S. Cl.
CPC .......... *G06T 11/00* (2013.01); *G06F 3/04842* (2013.01); *G09B 11/04* (2013.01)

(58) Field of Classification Search
CPC .......... G09B 11/00; G09B 11/04; G09B 11/06
See application file for complete search history.

(56) References Cited

U.S. PATENT DOCUMENTS

| | | | |
|---|---|---|---|
| 10,033,943 B1* | 7/2018 | Sharma | G06F 3/00 |
| 2010/0149191 A1* | 6/2010 | Macura | G06F 3/0425 |
| | | | 345/473 |
| 2015/0221070 A1* | 8/2015 | Winnemoeller | G06V 40/171 |
| | | | 382/203 |

FOREIGN PATENT DOCUMENTS

WO    WO-2016131507 A1 *  8/2016  ............. G09B 11/06

* cited by examiner

*Primary Examiner* — Robert J Utama
(74) *Attorney, Agent, or Firm* — Robert M Cox, Esq.

(57) ABSTRACT

A system and method using two or more devices to create an augmented reality (AR) environment for efficiently scaling images onto large work surfaces (large canvas/walls/built environments) by superimposing a selected image onto the real-time capture of the work surface for one or more painters to draw with their preferred drawing apparatus. The system and method combine at least one camera device and at least one display device, but can combine multiple cameras and/or multiple displays allowing even larger work surfaces to be painted and allowing multiple painters to work side-by-side on different sections of the mural. The system and method further provide tools: to anchor the work surface, for step by step training, for image verification (comparison of ongoing work to the selected image), for breakdown mode (displaying layers filtered by color value or level of darkness), and for recording video of the muraling process.

20 Claims, 9 Drawing Sheets

(PREVIOUSLY DISCLOSED)

MULTI DEVICE ARTWORK SCALING SYSTEM

CROSS REFERENCE TO RELATED APPLICATIONS

The present application claims the benefit of co-pending U.S. application Ser. No. 16/394,943 filed Apr. 25, 2019, entitled Illustration Instructor, the disclosure of which is incorporated by reference in its entirety.

FIELD OF THE INVENTION

The field of the present invention generally relates to an apparatus and method for teaching drawing technique. More particularly, the present invention relates to an apparatus and a method for drawing, learning techniques, and tracing existing pictures or portions thereof to scale them to larger surfaces, for example, large format canvases or murals.

BACKGROUND OF THE INVENTION

Creating large artwork is hard; it is difficult to get accurate proportions and scale small artwork into larger artwork. Without tools, it's almost impossible to accurately scale a small image to a large surface by hand. Artists employ a variety of tools and techniques to accomplish this task, but such tools range from the wasteful, to the time consuming, to those with impossible tradeoffs.

Cartoons

A first category of accurately scaling art to large formats (such as murals) is called cartoons. In order to use Cartoons, you need to print out your drawing at the exact scale, poke holes where you want your outlines to go, adhere the printout to the surface that you want to draw on, then pound chalk or charcoal against the printout so that the chalk/charcoal holes leave a stencil of where your outlines should be.

The Cartoons approach suffers the following disadvantages: it is only used for outlines, it is messy, it requires a printer (particularly a large-format printer), lots of paper (enough to cover the entire project surface), it is extremely time consuming, and given the use of so much paper and ink/toner it is quite environmentally wasteful.

Gridding Systems

A second category of accurately scaling art to large formats (such as murals) is using gridding systems. The grid method involves drawing a grid over your reference photo, then drawing a grid of equal ratio on your work surface (paper, canvas, wood panel, etc.). You then draw the image on your wall or canvas, focusing on one square at a time, until the entire image has been transferred. Once you're finished, you simply erase or paint over the grid lines, and start working on your painting.

Gridding Systems suffer the following disadvantages: it is extremely time consuming, it still involves a lot of freehand drawing, it is not easy to compare your mural work to the reference image (artists are still mentally scaling the image, but doing so in smaller sections), drawing inside the grid cells can still slip out of proportions, and grid apps and newer grid systems (such as doodle grids) offer no substantial improvements other than eliminating the need to draw lines or other shapes on your surface. There would still be no easy way to compare the mural to the reference image.

Projectors

A third category of accurately scaling art to large formats (such as murals) is using projectors. Modern projectors display your reference image exactly where you want to draw it, making it very easy to scale your reference image by tracing it directly onto a surface; however, disadvantages remain. Outdoor projectors are generally expensive and still require you to draw in a dark environment because projection will be hard to see in daylight. This makes it difficult or impossible to draw outdoors during daylight hours or to draw in well-lit areas that can not be dimmed (such as active lobbies & transit areas). If it is possible to work in the dark or at night, there is no way to directly compare the colors you have painted to the reference image (until the lights come back on or the sun rises). If you are drawing over multiple days, you will need to realign the image and place the projector in the exact same spot (which is extremely difficult in public areas), otherwise your drawing proportions will shift each time the projector rig moves. Finally, good projectors are generally large, bulky and require external access to a power outlet or a reliable generator.

Single-Device Augmented Reality "AR" Solutions

A more recent category for accurately scaling art to large formats (such as murals) is Single-Device Augmented Reality (AR). This technology uses a phone, tablet or AR Headsets that has a screen that faces the artist and a camera that faces the drawing surface. AR technology overlays the reference image that the artist wants to draw on top of a live feed from the camera or on top of a clear lens (headsets) so it appears as if the reference image is displayed on the drawing surface when looking at the device's screen or lens.

Because the camera and the viewing screen are the same device, in order for the reference image to be overlaid on the drawing surface, the artist must keep the device between themselves and the drawing surface at all times.

Using computer vision algorithms and device sensors such as Lidar, the device moves and aligns the image as the artist moves to create the illusion that the reference image is locked in place on the drawing surface. Looking through the screen or headset, it would appear that the reference image is actually on the drawing surface in the physical world. This method lets the artist control transparency and manipulate other aspects of the image easily as they draw. This allows artists to draw in well lit places and lets them compare color values to their reference image. This method is also extremely fast to set up and does not need to be plugged in.

While Single-Device AR Solutions represent a major advance over other existing solutions, there are still serious disadvantages. Because the device's camera is in between a person's line-of-sight and the surface they want to draw on, the artist must always be standing behind the device's camera in order to see their reference displayed on the surface. For larger artwork this means that you can only see a small portion of your larger drawing at a time. Currently available consumer AR technology is not advanced enough to be spatially aware enough to keep the reference image locked in the same place as the artist moves around. Current AR technology, when used in this fashion, causes images to be out of proportion and warped. Because current AR technology fails to securely lock the position of the reference image in place, the reference image that the user is tracing will float around the canvas/drawing surface by a few centimeters to a few feet making it impossible to trace a large drawing accurately. The larger the surface, the harder it is to have the reference image locked in place throughout the drawing process as the artist moves around.

General Background to Single-Device Augmented Reality "AR" Solutions

Leonardo Da Vinci worked with optical inventions including the camera obscura. FIG. 1A is a camera obscura, which is a dark box (or even a very dark room) with a very small hole in one wall that lets in light. The small hole can include a lens. Directly across from the hole the image from the outside world will be projected onto the wall but upside down. In other words, the scene is reproduced, inverted (thus upside-down) and reversed (left to right), but with color and perspective preserved. The image can be projected onto paper, and can then be traced to produce a highly accurate representation.

The term "camera obscura" also refers to constructions or devices that make use of the principle within a box, tent, or room. Camera obscurae with lenses in the opening have been used since the second half of the 16th century and became popular as an aid for drawing and painting. The camera obscura box was developed further into the photographic camera in the first half of the 19th century when camera obscura boxes were used to expose light-sensitive materials to the projected image.

A camera lucida, shown in FIG. 1B, is an optical device used as a drawing aid by artists. The camera lucida performs an optical superimposition of the subject being viewed upon the surface upon which the artist is drawing. The artist sees both scene and drawing surface simultaneously, as in a photographic double exposure. This allows the artist to duplicate key points of the scene on the drawing surface, thus aiding in the accurate rendering of perspective.

The name "camera lucida" (Latin for "light chamber") is intended to recall the much older drawing aid, the camera obscura (Latin for "dark chamber"). There is no optical similarity between the devices. The camera lucida is a light, portable device that does not require special lighting conditions. No image is projected by the camera lucida.

In its simplest form of camera lucida, the artist looks down at the drawing surface through a half-silvered mirror tilted at 45 degrees. This superimposes a direct view of the drawing surface beneath, and a reflected view of a scene horizontally in front of the artist. This design produces an inverted image which is right-left reversed when turned the right way up. Also, light is lost in the imperfect reflection.

SUMMARY OF THE INVENTION

The present apparatus and method describe a Multi-Device Augmented Reality ("AR") environment to aid drawing on physical surfaces, comprised of one or more visualization devices acting as receivers, one or more camera devices that transmit(s) the camera feed(s) to the linked visualization devices, and one or more processor(s) to align and build the AR layers.

The visualization device(s) and/or camera device(s) apply selected image(s) on top of the camera feed(s) creating an augmented reality (AR) environment so that the artist(s) can (1) visualize their selected image(s) on the surface where they want to paint/draw it, (2) compare their reference image to the artwork on the physical surface, and (3) see their physical artwork from a distance while simultaneously standing very close to it. The context for that being that artists, when they create large artwork, often need to stand close and far away to see how their artwork looks as a whole. This helps them see if their artwork is coherent and in proportion. This also allows multiple artists to trace and paint different sections of the selected image on the work surface at the same time, each with their own visualization device offering some or all of the disclosed features: layers, filters, strobe (between selected image & real-time image feed).

Additional features of Multiple Device Mural Instructor include using an anchor to lock the reference image in place. This means the artist can move their camera device around without needing to realign their reference image to their drawing/painting. An anchor is a physical marker affixed on or near the work surface that aids the device in tracking the position of the camera(s) relative to the work surface and therefore where the selected image or object should be placed over the work surface (and whether and how to adjust its geometry to follow the real-time feed of the work surface consistently. This becomes critical to the alignment, focus and geometry of the overlay of a selected image over the real-time feed from the work surface—ensuring the if the cameras are moved (accidentally or when being set-up for subsequent painting sessions)—the overlay is kept in position and consistent geometry.

In one embodiment of the present system, users can set a single anchor to secure the reference image in place. In a further embodiment of the present system, users can set two or more anchors to secure the references in place. In a further embodiment still, the present system can use existing artwork or the surroundings of the work surface as a virtual anchor. An anchor should be as large as possible with bold, asymmetrical designs upon it. If working outdoors, the anchor should be weatherproof and affixed so that it will not be disturbed for the duration of the project or can comprise features of the mural surface itself (such as brick patterns, cracks in the wall, edges of the worksurface, or edges of the structure).

The present system can utilize computer vision to realign images. Computer Vision can identify the anchor, anchors, or virtual anchor to position the reference image in place.

The present system is compatible with smartphones, tablets and other digital displays, but can also display the augmented reality overlay with an augmented reality (AR) or virtual reality (VR) headset. When using device screens (including a AR/VR headset) it is possible for artists to utilize hand gesture controls—using hand gestures to control attributes of the reference image virtually projected to the surface.

The present system allows multiple devices with cameras transmitting a different viewpoint to allow multiple real-time captures to be stitched together to effectively cover a larger work surface. In a further embodiment of the present invention, each of multiple displays can independently filter, layer, focus, zoom, strobe, or even enter into step-by-step guidance—allowing multiple painters to be working side-by-side on their own sections of the mural.

The present system allows for comparison of the reference image to the ongoing real-time capture so artists can see how accurate their mural is turning out. In one embodiment, the system can provide comparison by strobing (or rapidly switching) between the selected image, the captured scene and the combined overlay. In a further embodiment, the system can provide comparison by strobing (or rapidly switching) between color- or greyscale-filtered selected component parts of the selected image and similarly color- or greyscale-filtered versions of the captured scene. In a further embodiment, the system can provide image verification by numerically scoring the similarity of the captured scene against the selected image.

The present system allows the real-time feed and/or the display feed to be recorded to later showcase the mural making process (for example for instructional or promotional purposes).

BRIEF DESCRIPTION OF THE DRAWINGS

Preferred and alternative examples of the present invention are described in detail below with reference to the following Figure drawings.

DETAILED DESCRIPTION

Figure 1A:
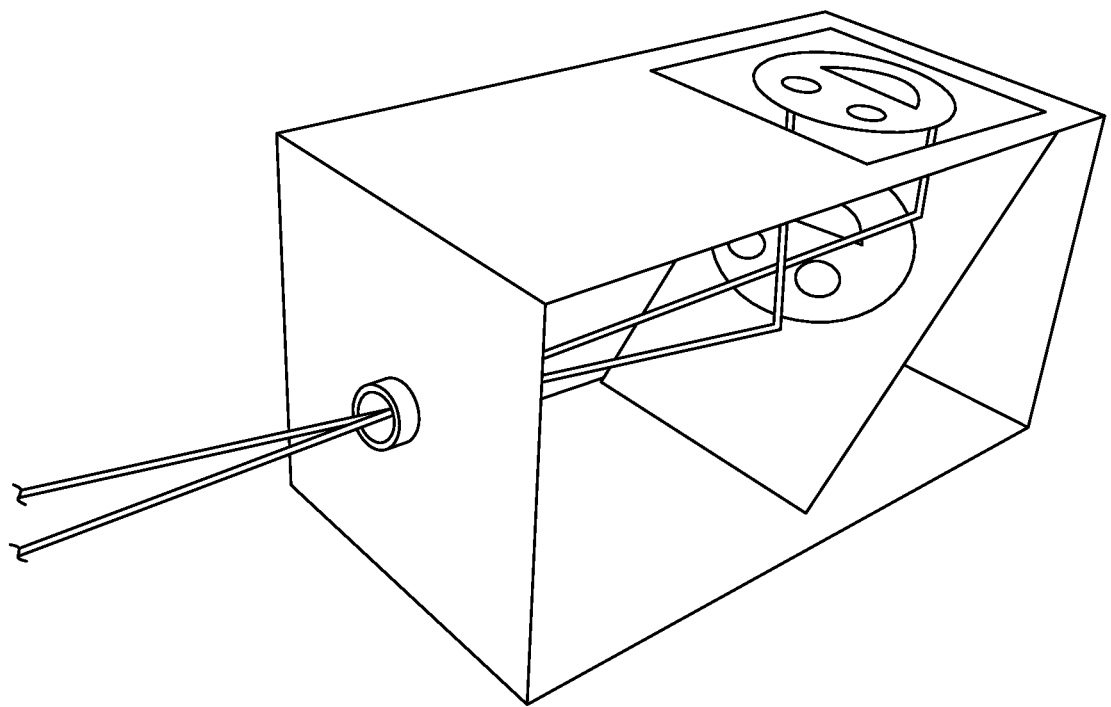
FIG. 1A is a perspective drawing of a camera obscura (a prior art technique)

The prior art object shown in FIG. 1A is a Camera Obscura, a darkened box with an opening to the left allowing an image of the well-lit scene to appear inside the box (inverted). In this particular version, the image is reflected by a mirror to appear on a translucent view window.

Figure 1B:
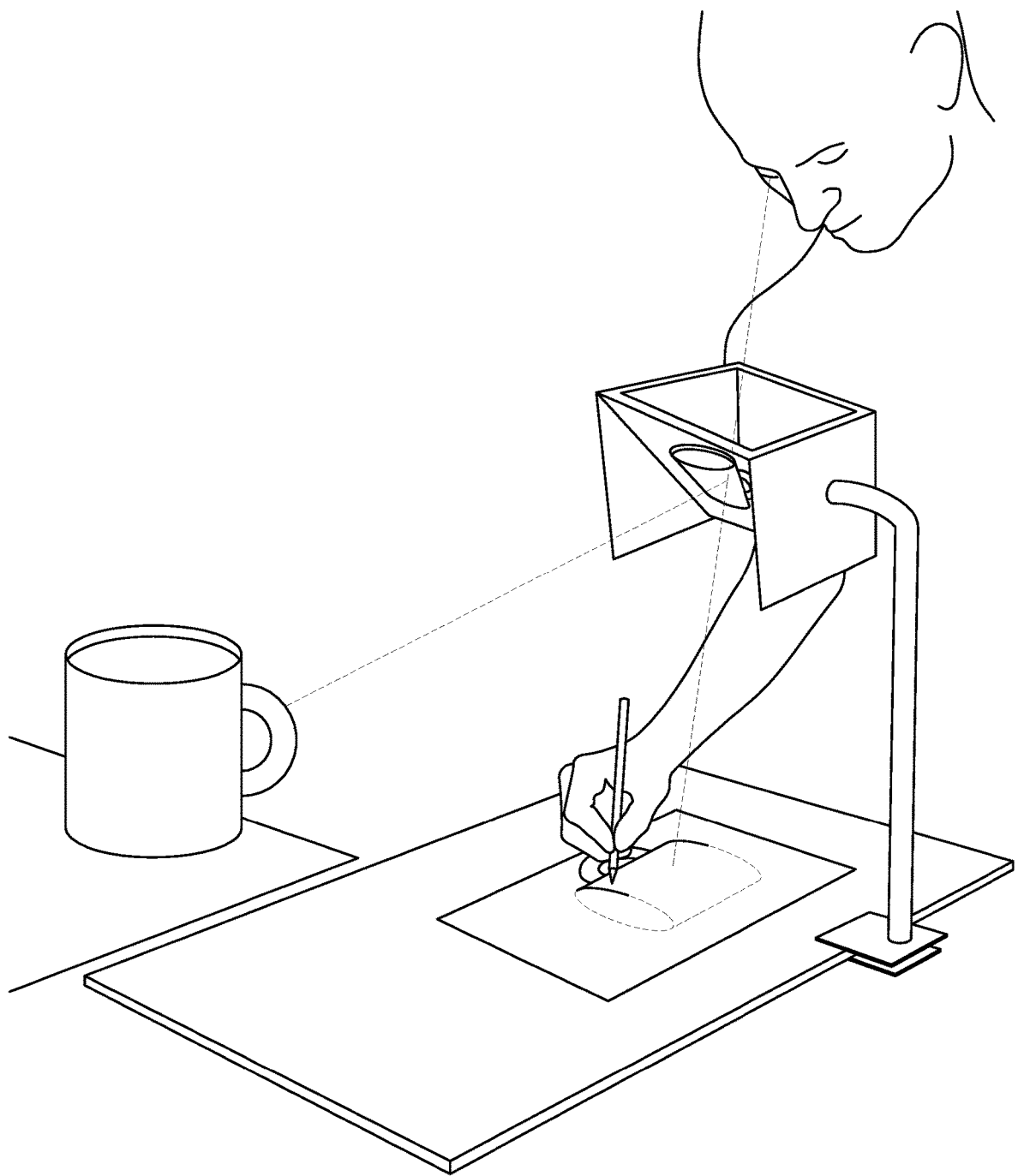
FIG. 1B is a perspective drawing of a camera lucida (a prior art technique)

The prior art object shown in FIG. 1B is a Camera Lucida, another tool which uses a reflective glass to overlay a selected object over the work surface.

Figure 2:
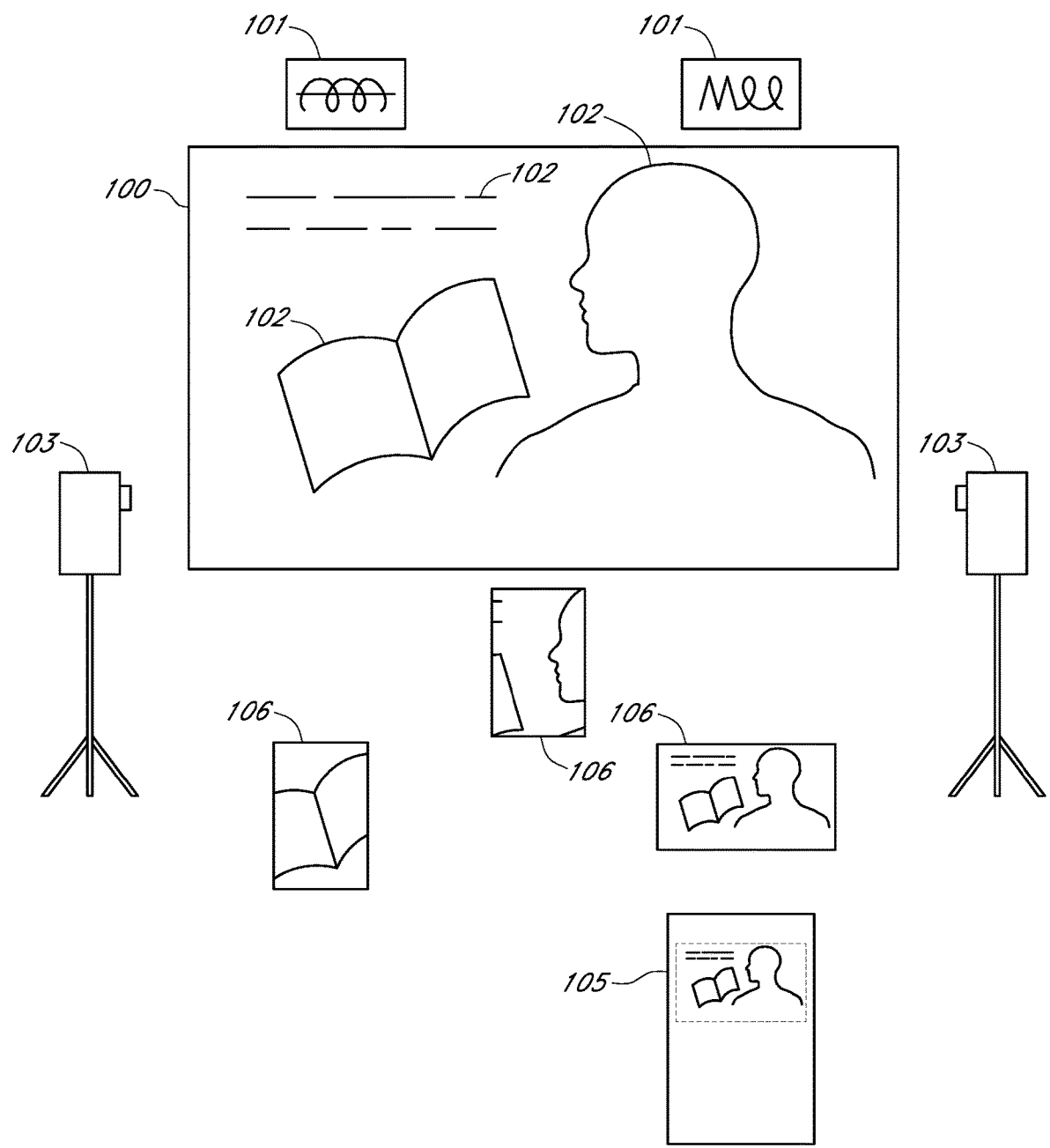
FIG. 2 is a drawing of a multi device mural instructor showing a finished mural on a wall, two anchors, two cameras, three displays, and a selected image.

The invention shown in FIG. 2 is a multi device mural illustrator featuring 100 a wall (or, generically, a large scale work surface), 101 two anchors, 102 finished drawing elements, 103 two devices with cameras, 105 the selected image (in this case shown on a digital display, such as a tablet), 106 three devices with displays, each focused on different aspects of the image and each showing the selected image overlaid over the real-time feed from the cameras to allow comparison of the selected image with the scaled drawing on the work surface.

Figure 3:
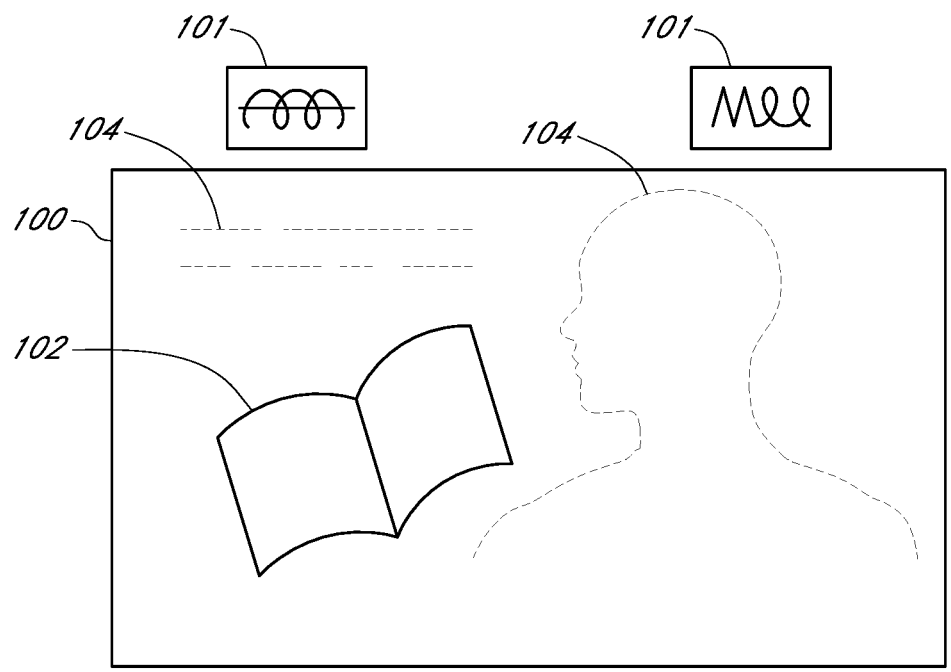
FIG. 3 is a drawing of a multi device mural instructor showing a partially completed mural on a wall, two anchors, one camera, and one display (an AR or VR headset)
Figure 3:
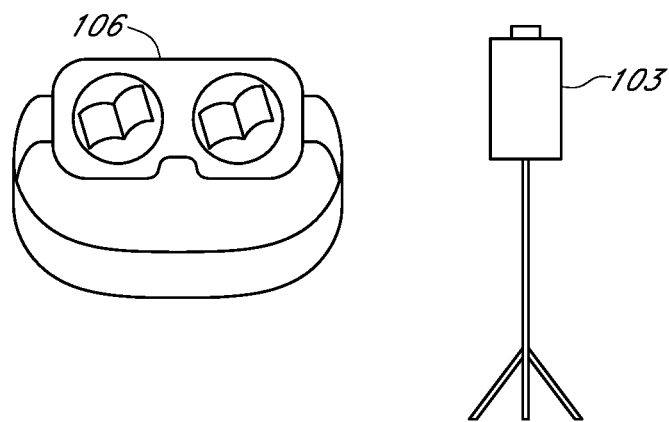

The invention shown in FIG. 3 is a multi device mural illustrator featuring 100 a work surface, 101 two anchors, 102 finished drawing elements, 103 a device with a camera, 104 intended drawing elements (not yet drawn, but visible in AR or VR overlay), 106 a device with display (in this case an AR or VR headset).

Figure 4:
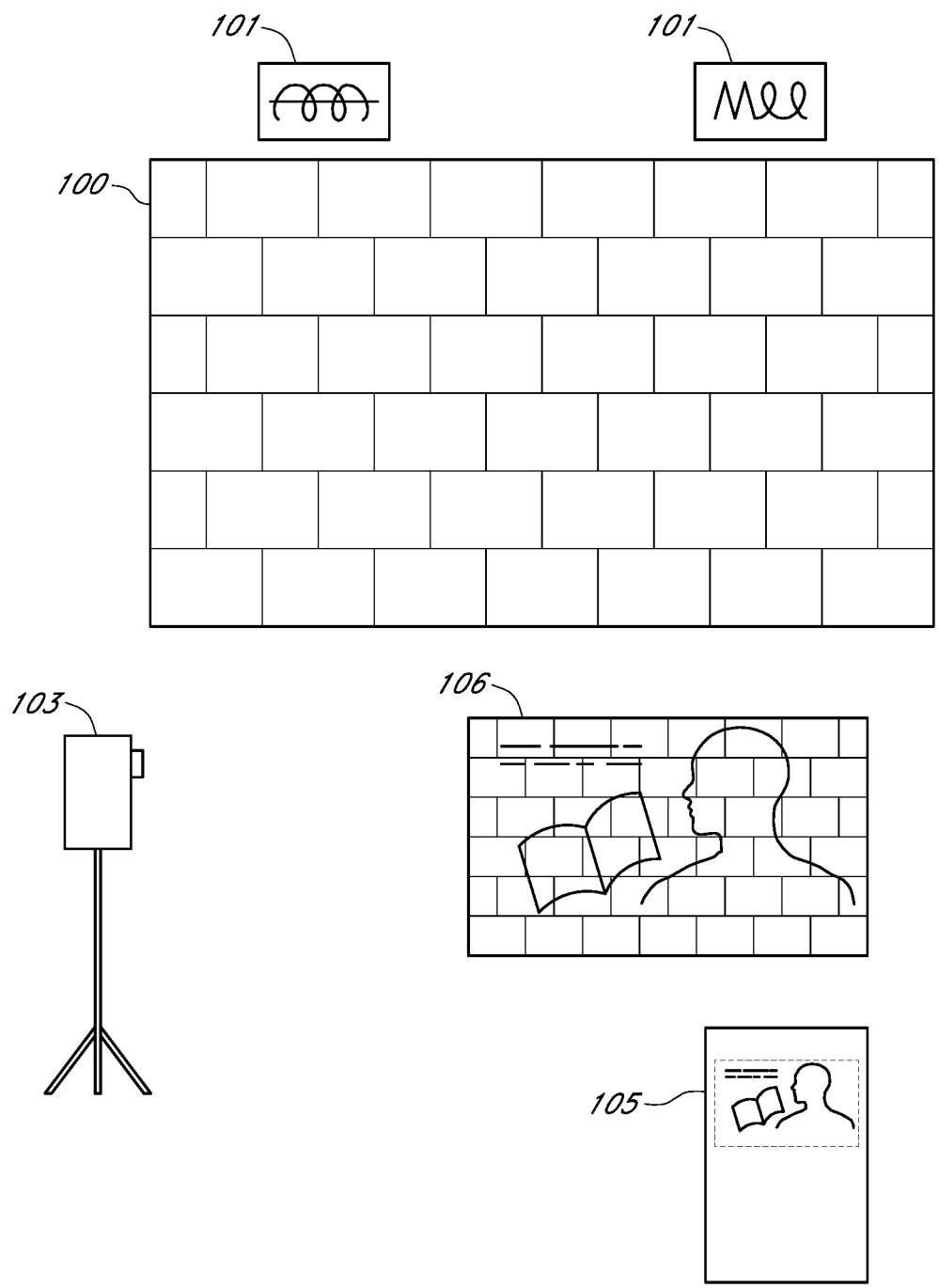
FIG. 4 is a drawing of a multi device mural instructor showing a wall, two anchors, a camera, a selected image, and a display (showing the selected image overlayed over the real-time feed of the mural-in-progress)

The invention shown in FIG. 4 is a multi device mural illustrator featuring 100 a work surface (in this case a cinderblock wall), 101 two anchors, 103 a device with a camera (capturing a real-time image feed of the mural in progress), 105 a selected image (in this case shown on a digital display, such as a tablet), 106 a device with a display showing the selected image overlaid over the real-time feed from the camera.

Figure 5:
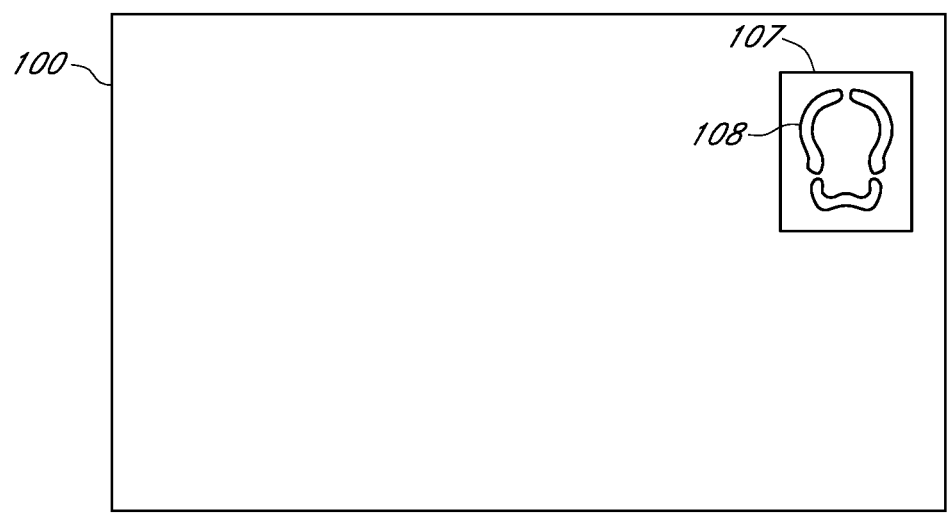
FIG. 5 is a drawing of the cartoons process (a prior art technique), showing a paper stencil through which chalk can be pounded.
Figure 6:
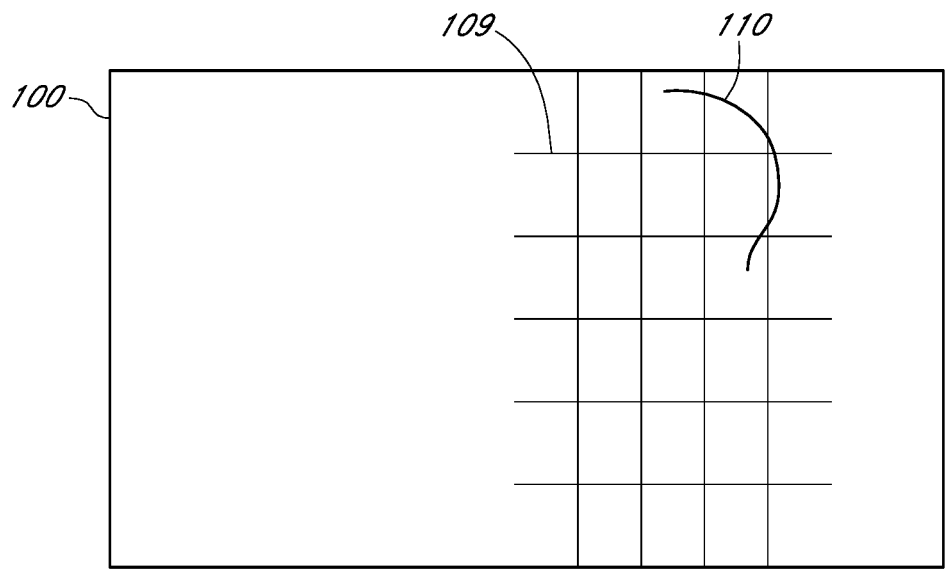
FIG. 6 is a drawing of the gridding systems process (a prior art technique) showing a scaled grid on the wall and a matching grid on the selected image.
Figure 6:
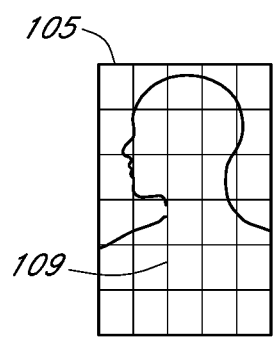

The prior art technique shown in FIG. 5 is called cartoons. Using 107 printed paper (with 108 cutout holes or stencils) to cover the entire 100 work surface and pound chalk through the paper—this process is both time consuming and wasteful of materials The prior art technique shown in FIG. 6 is called a gridding system. Using 109 scaled gridlines lightly drawn on the 100 work surface and 109 scaled gridlines also carefully drawn or overlaid on 105 the selected image, the grids allow artists to breakdown the image into smaller sections and focus on the colors, shapes and letters in each section as though it were its own smaller painting abstracted from the entire shape, drawing the 110 scaled image section by section.

Figure 7:
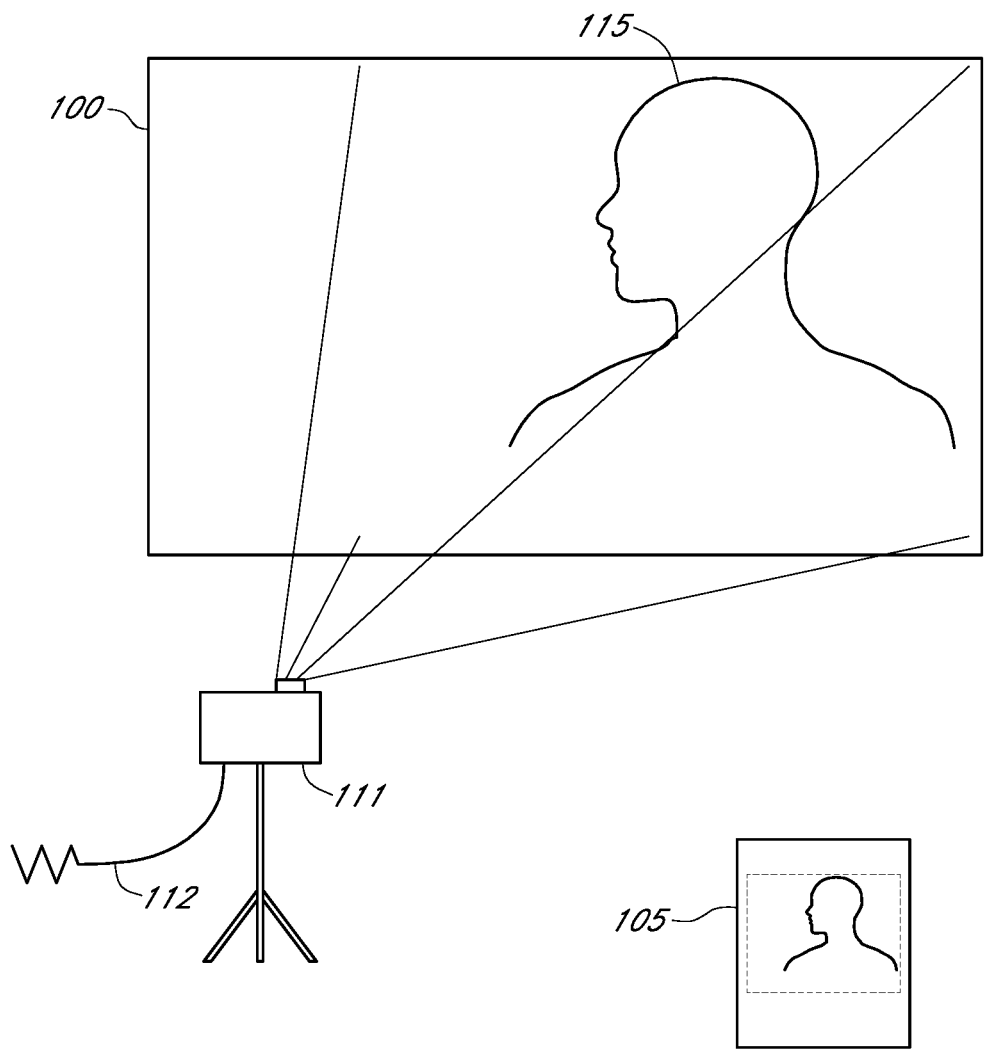
FIG. 7 is a drawing of the projector process (a prior art technique) showing a projector, a power line, a selected image, and a projected image on the wall.

The prior art technique shown in FIG. 7 is a projection system. Using 111 a projector, the 105 selected image is projected onto 100 a work surface. The 115 projected image can be very difficult to see in all but darkened-room/nighttime conditions; however, the painter's work—particularly colors—will be very difficult to see and track in the same conditions required for the projection to appear visible. Furthermore the 111 strong outdoor projector requires a 112 power source (such as main power or a generator).

Figure 8:
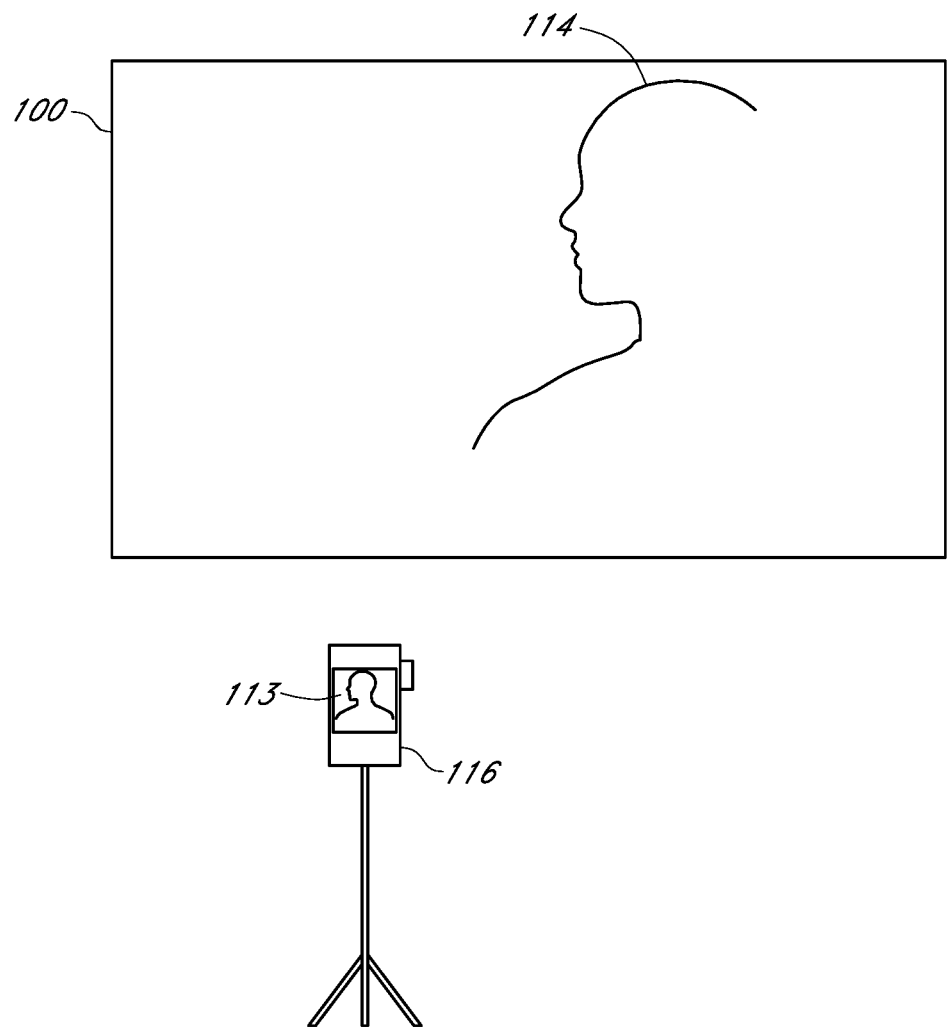
FIG. 8 is a drawing of the single device augmented reality (AR) process (an previously disclosed technique) showing a partially completed mural, a device featuring camera and display (showing the selected image overlayed over the real-time feed of the mural-in-progress)

The previously described system and method shown in FIG. 8 is a single device augmented reality system. Using 116 a single device with a camera and display shows a 113 selected image as overlaid over the real-time camera feed of the 114 work in progress on the 100 work surface. While this previously described system is greatly advantageous, it remains quite limited in its application to large-scale work surfaces. The device must be positioned a sufficient distance back from the work surface for its camera to capture the entire frame; however, at this distance the painter will not have the device or its display at hand to make ready, repeated reference during their work.

Preferred and alternative embodiments of the invention include the following:

Embodiment A

An apparatus for providing a template comprising: a first device, itself comprising: a first camera; a first display; a first memory; and a first processor configured to:
  communicate with other devices of the apparatus (via wire or wirelessly);
  allow a first user to select an image to be drawn (a selected image);
  capture a scene in real-time from a first viewpoint with the first camera (a first captured scene);
  overlay the selected image on the first captured scene (a first combined overlay); and
  display the first combined overlay on the first display.

Embodiment B

The apparatus for providing a template according to embodiment A, wherein the first processor is further configured to:
  break the selected image down into component parts;
  allow the first user to select component parts of the selected image (selected component parts);
  overlay the selected component parts on the first captured scene as a template; and display the template on the first display.

Embodiment C

The apparatus for providing a template according to embodiment B, wherein the first processor is further configured to:
- filter the selected component parts by defining one or more layers by a range of color values or levels of darkness (each a filtered component layer);
- overlay the filtered component layers on the combined captured scene (a filtered template); and
- display the filtered template on the first display.

Embodiment D

The apparatus for providing a template according to embodiment A, wherein the first processor is further configured to compare a selected image with a first captured scene.

Embodiment E

The apparatus for providing a template according to embodiment A, wherein the first processor is further configured to provide image verification by comparing the selected image with the first captured scene.

Embodiment F

The apparatus for providing a template according to embodiment A, wherein the first processor is further configured to:
- increase and decrease a displayed size of a selected image using a zoom function (a size adjusted image); and
- display the size adjusted image and the first captured scene on the first display.

Embodiment G

The apparatus for providing a template according to embodiment A, wherein the first user is guided to reproduce the selected image following step by step instructions.

Embodiment H

The apparatus for providing a template according to embodiment A, further comprising a second device, itself comprising:
- a second camera;
- a second display;
- a second memory; and
- a second processor configured to:
  - communicate with other devices of the apparatus (via wire or wirelessly);
  - capture a second viewpoint with the second camera (a second captured scene);
  - transmit the second captured scene to the first device, wherein the first processor of the first device aligns and assembles the first captured scene and the second captured scene in a combined captured scene.

Embodiment I

The apparatus for providing a template according to embodiment H, wherein the second processor is further configured to display the combined captured scene on the second display.

Embodiment J

The apparatus for providing a template according to embodiment I, further comprising a third device, itself comprising:
- a third display;
- a third memory; and
- a third processor configured to:
  - communicate with other devices of the apparatus (via wire or wirelessly);
  - display all or a portion of the combined captured scene overlaid with the selected image on the third display.

Embodiment K

The apparatus for providing a template according to embodiment J, wherein the apparatus is further configured to:
- break the selected image down into component parts;
- allow the one or more users to independently select component parts of the selected image (selected component parts);
- allow the one or more users to independently overlay the selected component parts on the combined captured scene (each a template); and
- allow the one or more users to independently display the templates on one or more displays.

Embodiment L

The apparatus for providing a template according to embodiment K, wherein the apparatus is further configured to:
- allow the one or more users to independently filter the selected component parts by defining one or more layers by a range of color values or levels or darkness (each a filtered component layer);
- allow the one or more users to independently overlay the filtered component layers on the combined captured scene (each a filtered template); and allow the one or more users to independently display the filtered templates on one or more displays;

Embodiment M

The apparatus for providing a template according to embodiment L, wherein the one or more displays are each selected from the group consisting of: smartphones, tablets, augmented reality headsets, and virtual reality headsets.

Embodiment N

The apparatus for providing a template according to embodiment J, further comprising a fourth device, itself comprising:
- a fourth display;
- a fourth memory; and a fourth processor configured to:
  communicate with other devices of the apparatus (via wire or wirelessly); and
  display all or a portion of the combined captured scene overlaid with the selected image on the fourth display.

Embodiment O

The apparatus for providing a template according to embodiment N, wherein the apparatus is further configured to:
  break the selected image down into component parts;
  allow the one or more users to independently select component parts of the selected image (selected component parts);
  allow the one or more users to independently overlay the selected component parts on the combined captured scene (each a template); and
  allow the one or more users to independently display the templates on one or more displays.

Embodiment P

The apparatus for providing a template according to embodiment 0, wherein the apparatus is further configured to:
  allow the one or more users to independently filter the selected component parts by defining one or more layers by a range of color values or levels or darkness (each a filtered component layer);
  allow the one or more users to independently overlay the filtered component layers on the combined captured scene (each a filtered template); and
  allow the one or more users to independently display the filtered templates on one or more displays.

Embodiment Q

The apparatus for providing a template according to embodiment P, wherein the one or more displays are each selected from the group consisting of: smartphones, tablets, augmented reality headsets, and virtual reality headsets.

Embodiment R

The apparatus for providing a template according to embodiment A, wherein:
  one or more anchors are affixed on or near a work surface in the first captured scene; and
  the first processor is further configured to utilize the position of the one or more anchors to realign the selected image or selected component parts relative to the first captured scene each time the camera moves.

Embodiment S

The apparatus for providing a template according to embodiment A, wherein:
  the first processor is further configured to record a digital video of the first captured scene or first combined overlay to the first memory.

Embodiment T

A method for providing a template comprising:
  selecting an image to be drawn from a first memory of a first device (a selected image);
  overlaying the selected image on a scene captured in real-time from a first viewpoint (a first captured scene) by a first camera of the first device as a the first combined overlay; and
  displaying the first combined overlay on a first display.

Embodiment U

The method for providing a template according to embodiment T, wherein the template is used to guide a first user to reproduce the selected image.

Embodiment V

The method for providing a template according to embodiment T, wherein the template is one of an enlarged or reduced version of the selected image.

Embodiment W

The method for providing a template according to embodiment U, further comprising: providing a tutorial to draw the image step-by-step.

Embodiment X

The method for providing a template according to embodiment T, further comprising:
  displaying grid lines on the first display.

Embodiment Y

The method of providing a template according to embodiment T, further comprising:
  displaying the first combined overlay on a second display of a second device.

Embodiment Z

The method of providing a template according to embodiment Y, further comprising:
  displaying the first combined overlay on a third display of a third device.

Embodiment AA

The method of providing a template according to embodiment T, further comprising:
  breaking the selected image down into component parts;
  allowing a first user to select component parts of the selected image (selected component parts);
  overlaying the selected component parts on the first captured scene as the template; and
  displaying the template on the first display.

Embodiment BB

The method of providing a template according to embodiment T, further comprising:
  combining a first captured scene with a scene captured in real-time from a second viewpoint (a second captured scene) by a second camera on a second device (said first captured scene and said second captured scene together a combined captured scene);

overlaying the selected image on the combined captured scene (an aggregate combined overlay);
displaying the aggregate combined overlay on the first display.

Embodiment CC

The method of providing a template according to embodiment BB, further comprising:
breaking the selected image down into component parts;
allowing a first user to select component parts of the selected image (selected component parts);
overlaying the selected component parts on the combined captured scene as the template; and
displaying the template on a second display of a second device.

Embodiment DD

The method of providing a template according to embodiment BB, further comprising:
displaying the aggregate combined overlay on a third display of a third device.

Embodiment EE

The method of providing a template according to embodiment DD, further comprising:
breaking the selected image down into component parts;
allowing a first user to select component parts of the selected image (selected component parts);
overlaying the selected component parts on the combined captured scene as the template; and
displaying the template on the third display.

Embodiment FF

The method of providing a template according to embodiment DD, wherein each of the displays can be selected from the group consisting of: smartphones, tablets, augmented reality headsets, virtual reality headsets.

Embodiment GG

The method of providing a template according to embodiment DD, wherein each of the displays can be independently controlled by different users.

Embodiment HH

The method of providing a template according to embodiment DD, wherein:
attaching one or more anchors on or near a work surface in the first captured scene; and
utilizing the position of the one or more anchors to realign the selected image or the selected component parts relative to the first captured scene each time the camera moves.

Embodiment II

The apparatus for providing a template according to embodiment DD, wherein:
recording a digital video of the first captured scene or first combined overlay to the first memory.

Embodiment JJ

The method of providing a template according to embodiment Y, wherein each of the displays can be selected from the group consisting of: smartphones, tablets, augmented reality headsets, and virtual reality headsets.

Embodiment KK

The method of providing a template according to embodiment Y, wherein each of the displays can be independently controlled by different users.

Embodiment LL

The method of providing a template according to embodiment Y, wherein:
attaching one or more anchors on or near a work surface in the first captured scene; and
utilizing the position of the one or more anchors to realign the selected image or the selected component parts relative to the first captured scene each time the camera moves.

Embodiment MM

The apparatus for providing a template according to embodiment Y, wherein:
recording a digital video of the first captured scene or first combined overlay to the first memory.

The embodiments of the invention in which an exclusive property or privilege is claimed are defined as follows:

1. An apparatus for providing a template comprising: a first device, comprising:
a first camera; a first display; a first memory; and a first processor configured to:
communicate within the apparatus;
allow a first user to select an image to be drawn (a selected image);
capture a scene in real-time from a first viewpoint with the first camera (a first captured scene);
overlay the selected image on the first captured scene (a first combined overlay); and
display the first combined overlay on the first display; and, wherein,
one or more anchors are affixed on or near a work surface in the first captured scene; and,
the first processor is further configured to utilize the position of the one or more anchors to realign the selected image relative to the first captured scene each time the camera moves relative to the one or more anchors.

2. A method for providing a template comprising:
selecting an image to be drawn from a first memory of a first device (a selected image);
capturing a scene in real-time from a first viewpoint (a first captured scene) by a first camera of the first device;
combining a first captured scene with a scene captured in real-time from a second viewpoint (a second captured scene) by a second camera on a second device (said first captured scene and said second captured scene together a combined captured scene);
overlaying the selected image on the combined captured scene (an aggregate combined overlay); and,
displaying the aggregate combined overlay on a third display of a third device.

3. The method of providing a template according to claim 2, further comprising:
breaking the selected image down into component parts;
allowing a first user to select component parts of the selected image (selected component parts);

overlaying the selected component parts on the combined captured scene as the template; and displaying the template on the third display.

4. The method of providing a template according to claim 2, wherein each of the displays can be independently controlled by different users.

5. The method of providing a template according to claim 2, wherein:

attaching one or more anchors on or near a work surface in the first captured scene; and utilizing the position of the one or more anchors to realign the selected image relative to the first captured scene each time the camera moves relative to the one or more anchors.

6. The apparatus for providing a template according to claim 2, wherein:

recording a digital video of the first captured scene, the first combined overlay, the second captured scene, the second combined overlay or the aggregate combined overlay.

7. An apparatus for providing a template comprising:

a first device, comprising:

a first camera; a first memory; and a first processor configured to:

communicate within the apparatus;

capture a scene in real-time from a first viewpoint with the first camera (a first captured scene); and, transmit the first captured scene; and, a second device, comprising:

a second display; a second memory; and a second processor configured to:

communicate within the apparatus;

allow a first user to select an image to be drawn (a selected image);

overlay the selected image on the first captured scene (a first combined overlay); and display the first combined overlay on the second display; and wherein, the first captured scene comprises a drawing surface.

8. An apparatus for providing a template according to claim 7, wherein:

the second device is positioned between the first device and the drawing surface or the second device is positioned adjacent to the drawing surface.

9. An apparatus for providing a template according to claim 7, wherein:

the second device is positioned such that the first user can operate said second device and such that the first user can access said drawing surface.

10. An apparatus for providing a template according to claim 8, wherein the second processor is further configured to:

break the selected image down into component parts;

allow the first user to select component parts of the selected image (selected component parts);

overlay the selected component parts on the first captured scene as a selected combined overlay; and display the selected combined overlay on the second display.

11. The apparatus for providing a template according to claim 10, wherein the second processor is further configured to:

filter the selected component parts by defining one or more layers by a range of color values or levels of darkness (each a filtered component layer);

overlay said filtered component layers on the first captured scene (a filtered combined overlay); and display the filtered combined overlay on the second display.

12. An apparatus for providing a template according to claim 9, wherein the second processor is further configured to:

break the selected image down into component parts;

allow the first user to select component parts of the selected image (selected component parts);

overlay the selected component parts on the first captured scene as a selected combined overlay; and display the selected combined overlay on the second display.

13. The apparatus for providing a template according to claim 12, wherein the second processor is further configured to:

filter the selected component parts by defining one or more layers by a range of color values or levels of darkness (each a filtered component layer);

overlay said filtered component layers on the first captured scene (a filtered combined overlay); and display the filtered combined overlay on the second display.

14. An apparatus for providing a template according to claim 7, further comprising:

one or more anchors on or near a work surface in the first captured scene; and wherein:

the second processor is further configured to:

realign the selected image relative to the first captured scene each time the first camera moves relative to the one or more anchors.

15. An apparatus for providing a template according to claim 14, wherein:

the second device is positioned between the first device and the drawing surface or the second device is positioned adjacent to the drawing surface.

16. An apparatus for providing a template according to claim 14, wherein:

the second device is positioned such that the first user can operate said second device and such that the first user can access said drawing surface.

17. An apparatus for providing a template according to claim 7, wherein:

the second device further comprises:

a second camera; and, wherein, the second processor is further configured to:

capture a second viewpoint with the second camera (a second captured scene);

align and assemble the first captured scene and the second captured scene in a combined captured scene;

overlay the selected image on the combined captured scene (an aggregate combined overlay); and, display the aggregate combined overlay on the second display.

18. An apparatus for providing a template according to claim 17, further comprising:

one or more anchors on or near a work surface in the first captured scene and second captured scene; and wherein:

the second processor is further configured to:

realign the selected image, the first captured scene and the second captured scene related to one another each time the first camera or second camera moves relative to the one or more anchors.

19. An apparatus for providing a template according to claim 7, further comprising:
- a third device further comprising:
  - a third camera, a third memory, and a third processor configured to:
    - communicate within the apparatus;
    - capture a scene in real-time from a third viewpoint with the third camera (a third captured scene); and,
    - transmit the third captured scene; and,
- wherein, the second processor is further configured to:
  - align and assemble the first captured scene and the third captured scene in a combined captured scene;
  - overlay the selected image on the combined captured scene (an aggregate combined overlay); and,
  - display the aggregate combined overlay on the second display.

20. An apparatus for providing a template according to claim 19, further comprising:
- one or more anchors on or near a work surface in the first captured scene and third captured scene; and
- wherein:
  - the second processor is further configured to:
    - realign the selected image, first captured scene and third captured scene relative to one another each time the first camera or third camera moves relative to the one or more anchors.

* * * * *